United States Patent
Thiele et al.

(10) Patent No.: US 8,411,676 B2
(45) Date of Patent: *Apr. 2, 2013

(54) RECONFIGURABLE COMPUTE ENGINE INTERCONNECT FABRIC

(75) Inventors: Matthew J. Thiele, Hampstead, NH (US); Robert P. Boland, Wilmington, MA (US); Peter O. Luthi, Nashua, NH (US)

(73) Assignee: Wisterium Development LLC, Wilmington, DE (US)

( * ) Notice: Subject to any disclaimer, the term of this patent is extended or adjusted under 35 U.S.C. 154(b) by 127 days.

This patent is subject to a terminal disclaimer.

(21) Appl. No.: 12/546,657

(22) Filed: Aug. 24, 2009

(65) Prior Publication Data

US 2010/0014513 A1    Jan. 21, 2010

Related U.S. Application Data

(63) Continuation of application No. 10/530,160, filed as application No. PCT/US03/20414 on Jun. 26, 2003, now Pat. No. 7,580, 404.

(60) Provisional application No. 60/406,818, filed on Aug. 29, 2002.

(51) Int. Cl.
   *H04L 12/50* (2006.01)
(52) U.S. Cl. ......... 370/360; 370/380; 370/469; 709/221
(58) Field of Classification Search ........................ None
   See application file for complete search history.

(56) References Cited

U.S. PATENT DOCUMENTS

| | | |
|---|---|---|
| 5,307,342 A | 4/1994 | Georigiou et al. |
| 5,574,388 A | 11/1996 | Barbier et al. |
| 6,023,755 A | 2/2000 | Casselman |
| 6,209,050 B1 | 3/2001 | Iho et al. |
| 6,282,627 B1 | 8/2001 | Wong et al. |
| 6,340,897 B1 | 1/2002 | Lytle et al. |
| 6,421,322 B1 | 7/2002 | Koziy et al. |
| 6,430,623 B1 | 8/2002 | Alkhatib |
| 6,467,017 B1 * | 10/2002 | Ngai et al. ...................... 711/104 |
| 6,618,392 B1 | 9/2003 | Bray |
| 6,721,312 B2 | 4/2004 | Niu et al. |
| 6,768,746 B1 | 7/2004 | Coltro |
| 6,897,679 B2 * | 5/2005 | Cliff et al. ........................ 326/41 |
| 6,912,223 B1 | 6/2005 | Sloane |
| 7,080,156 B2 | 7/2006 | Lee et al. |
| 7,164,656 B2 | 1/2007 | Foster et al. |

(Continued)

OTHER PUBLICATIONS

Ha et al., "A Scalable Architecture to Support Networked Reconfiguration," Proceedings of Micro/Nanotribology and its Applications; Nov. 24, 1999; 7 pages.

(Continued)

*Primary Examiner* — Min Jung
(74) *Attorney, Agent, or Firm* — Brundidge & Stanger, P.C.

(57) ABSTRACT

A reconfigurable compute engine interconnect fabric includes a reconfigurable interconnect layer (24, FIG. 2) between an application layer (22) and a physical layer (26) which identifies the input and output pins for the engine and their functions.

14 Claims, 6 Drawing Sheets

U.S. PATENT DOCUMENTS

| | | |
|---|---|---|
| 7,519,696 B2 * | 4/2009 | Blumenau et al. ............ 709/221 |
| 2002/0018466 A1 | 2/2002 | Arai |
| 2003/0081580 A1 * | 5/2003 | Vaidyanathan et al. ...... 370/338 |
| 2003/0174731 A1 * | 9/2003 | Tafazolli et al. .............. 370/469 |
| 2004/0017829 A1 * | 1/2004 | Gray et al. .................... 370/469 |
| 2004/0028063 A1 | 2/2004 | Roy et al. |
| 2004/0034843 A1 | 2/2004 | Osann |
| 2004/0078103 A1 * | 4/2004 | Marshall et al. ................ 700/87 |
| 2004/0148069 A1 * | 7/2004 | Marshall et al. ................ 701/13 |
| 2006/0195729 A1 | 8/2006 | Huppenthal et al. |

OTHER PUBLICATIONS

Supplemental European Search Report from related Application No. EP03742296; May 21, 2010; 2 pages.

International Search Report, Dec. 15, 2003 from PCT Application No. PCT/US03/20414.

* cited by examiner

RECONFIGURABLE COMPUTE ENGINE INTERCONNECT FABRIC

This application is a continuation of U.S. patent application Ser. No. 10/530,160, filed Apr. 1, 2005, which is a national phase filing of international application PCT/US03/020414, filed Jun. 26, 2003, which claims the benefit of U.S. Provisional Patent Application 60/406,818, filed Aug. 29, 2002, which applications are incorporated by reference herein.

FIELD OF INVENTION

This invention relates to the interconnection of reconfigurable compute engines and more particularly to an interconnect fabric which itself is reconfigurable to support the different modes of operation for the interconnected reconfigurable compute engines.

BACKGROUND OF THE INVENTION

Reconfigurable compute engines in the past have been connected together so as to provide a computational system which can address many different types of tasks utilizing the same computer elements. Reconfigurable compute engines in general are exemplified by the field programmable gate arrays which when interconnected and appropriately programmed provide such functions as communications, signal intelligence, spatial processing, and jamming. When a suite of electronics is provided in an aircraft, it is oftentimes desirable to be able to reutilize the compute engines by changing their modes on the fly so that the avionics suite performs the above noted functions.

The reason for the utilization of field programmable gate arrays is so that the amount of equipment in an aircraft payload can be minimized due to space and power limitations. However, present field programmable gate arrays, FPGAs, are at present only programmable by programming the entire unit, and thus regardless of the different applications instantiated in the FPGAs oftentimes all interconnects must be changed to effectuate each mode change.

Inherent in the programming of such FPGAs is the ability to configure a physical layer which is coupled to the application programmed into the FPGA so as to provide input and output pins which carry data, timing, and other signals between the FPGAs that are connected together to provide a particular function.

Thus, it is important that the interconnect between the FPGAs support, inter alia, low deterministic latencies on the order of 1 to 10 nanoseconds and support edge sensitive signal distribution, for instance, for clocks, strobes, triggers and the like. There is also a need for the physical layer to support synchronized data transport.

In general, in order to provide the programming for a system composed of a number of FPGAs, it usually takes 400 man-hours to generate an FPGA configuration, which is preceded by research and development typically on the order of another 400 man-hours. Thus, for each mode of operation of the FPGAs, upwards of 800 man-hours are required.

Were one wishing to change the mode of operation of the FPGAs in an electronics bay of an aircraft one would not want to completely reprogram each one of the FPGAs for each mode of operation, nor rewire the interconnects between the modules. Thus when changing the mode from communications to, for instance, spatial processing, since there is a suite of software which is capable of supporting both applications without alteration, it would be highly desirable to be able to provide a reconfigurable fabric which could selectively connect each of the FPGA modules together and support, for instance, all of the timing required, including strobing, clock triggers and the like, and to, for instance, simultaneously accommodate packet switched networks as well as circuit switched networks. Moreover, whatever interconnect fabric is supplied, it must be as flexible and scalable as possible so as to utilize the various resources and switch between them on demand.

There exist systems where the functionality resides in either general purpose processors, GPPs, or reconfigurable compute engines, RCE, or combinations thereof. Such systems require interconnect fabrics that support a wide range of data flow. While general purpose processors have interconnect requirements that are being satisfied by current technologies such as Ethernet and Myrinnet, there is no suitable fabric with characteristics appropriate for use between reconfigurable compute engines.

Nowhere is such an interconnect fabric more urgently needed than in command, control, communications and computers used for intelligence, surveillance and reconnaissance. In some initiatives one needs to have a single system that can support communications, signal intelligence, jamming and run on the same hardware. As an example, it is an important requirement to have the hardware configured to have a number of receive channels and a number of transmit channels and to reconfigure the RCEs either to perform a communications function, signal intelligence or jamming.

As mentioned above, the RCEs presently are realized using FPGAs, with the combination of the FPGAs, for instance, in communications having a tuner that feeds them, with the FPGAs then feeding some processor and feeding back up to another FPGA and then to a transmitter. The interconnection protocols for connecting the FPGAs together provide for the receive and the transmit functions associated with communications.

On the other hand signal intelligence systems have only a tuner, FPGA and a processor. It will be appreciated that when operated in this mode there is no transmission so that only one half of the system normally configured for communications need be used. A jammer usually has processing followed by a FPGA, with the output of the FPGA then coupled to a transmitter so that the jammer consists in essence of a receiver and processing, with the output utilized to drive a transmitter for counter measure purposes.

In any avionics suite, there may be up to a dozen FPGAs which are connected to do many of a variety of functions. For instance at any given time, one might utilize five FPGAs to do communications and two to do signal intelligence. Later one might want to change the avionics around so that other FPGAs are connected together to provide, for instance, a spatial processing task or a jamming function.

In the past, one would utilize a well-defined static interconnection system for whatever mode or function was required to enable one FPGA to talk with another one.

However, because multi-mission systems are desired, it is important to be able to make the avionics package completely reconfigurable so that any FPGA can communicate with any other FPGA. In order to do so one needs a data fabric to allow the FPGAs to exchange data at high rates with low and deterministic latencies.

In order to connect the FPGAs, at the physical layer, one is talking about the ability to sustain a certain bandwidth on a given twisted pair. For twisted pairs one considers point-to-point terminations and the twisted pairs should be able to accommodate an edge sensitive strobe. It should be able to accommodate packet switched data, circuit switched data, or to accommodate fixed point-to-point connections with synchronized or asynchronized data.

Beyond the physical layer, one needs to be able to provide for different protocol stacks. Depending on the function implemented in any one of the reconfigurable compute engines, the particular protocol stack determines the kind of signaling whether it be discrete strobes, packet switched or circuit switched type of topologies or the like which have to be supported.

In short, one needs to have a common suite of hardware that would perform the multi-mission or multi-mode architecture. One therefore needs a fabric that has the ability to support all the different interconnect methods without having to go and change the underlying hardware.

Not only must the interconnect fabric support all kinds of clocks, it must also support those whose clock rates require that there be some minimum number of clock edges. It must also accommodate 8 B/10 B encoded signals and for instance, must support 10 MHz square wave clock pulses. The fabric must also be able to support discrete signals or signals which involve a simple level which is changed.

While the above lists some of the types of signals that one could expect, one also needs to have the fabric support a number of different mode changes without having to reload the FPGA. In short, one could think of the fabric that needs to be provided as a distributed switch architecture where the intelligence lies in each reconfigurable compute node.

In short, the fabric or physical structure should be able to support two modes. One mode is one in which there are parameters that are set as bits in a register or are embedded in each reconfigurable compute engine that defines what pins are to exist at one FPGA node. The pins are arranged such that they are either source pins, destination pins or pass through pins. However, just supporting the above while supporting a limited number of reconfiguration states is insufficient. What is required is a structure that does not lend itself to just being a bit in a register. What is necessary is the reloading of some number of the FPGAs so that complimentary configurations can be instantiated so that several of the FPGAs can talk to each other.

In short, what is necessary is logic that is installed in the FPGAs to instruct the way that the FPGAs are interconnected and allows one to change the way they are interconnected without having to reload the FPGA or without having to rewire them. What is therefore necessary is to have some modality to a virtual circuits set up that can be torn down at any time that a mode change needs to be made. With the respect to the pins for the FPGAs, a pin on a node needs to be able to be configured to be a transmitter, a receiver or beyond that to function as a pair for differential signal arrangements that can accommodate edge sensitive reconfigurable strobes or encoded signal structures. A reconfigurable fabric also needs to be able to accommodate either packet switched topologies or circuit switched topologies or combinations of each, as well as accommodating singleton kinds of implementations. Moreover, the fabric needs to be able to accommodate optical translations.

SUMMARY OF THE INVENTION

In order to accommodate all of the above functions, in the subject inventions an interconnect mechanism is provided that can be dynamically reconfigured to support scalable connection-oriented packet switched networks and connection-oriented circuit switched interconnects between multiple reconfigurable compute engines. The connections need to be made all at the same time so that there is no sharing and for all intents and purposes looks like a cross point array. The subject under interconnect mechanism or fabric supports multi-cast, broadcast, or single node-to-node embodiments.

It should be noted that the difference between the fabric and a bus is that with a bus sequential events are made to occur, where in a fabric simultaneous signaling occurs. In one embodiment, assuming that the RCE is an FPGA, each of the FPGAs is provided with an applications program, an interconnection layer, and a physical layer. It is the purpose of the interconnection layer to be reconfigurable regardless of what is happening with the application within the FPGA and to set the connections for the physical layer both as to what connections corresponds to what operation, and also the modality of the pin itself, whether it be a receiver pin, a transmitter pin, or a timing connection.

Thus, rather than having to completely reload a field programmable gate array, in the subject invention all that is necessary to interconnect the field programmable gate arrays for a given mode or function is to reconfigure the interconnection layer. This reduces programming from the aforementioned 800 man-hours to as little as 200 man-hours.

The subject invention thus provides the user with the flexibility of dynamically defining the modes and the interconnects necessary between the RCEs.

By not having to reconfigure each and every FPGA for a mode change, one can utilize a standardized physical layer which does not have to be changed during mode changes and which does not require a complete reload of the FPGA.

While companies that manufacture FPGAs design the input and output pins so that they can physically be inputs or outputs, and then can be driven at different voltage levels, utilization of the subject programmable interconnect layer brings the programming to another level. The interconnect layer defines the functions of the pins and the functions of groups of pins as well as describing or designating the data and where it is to flow.

In short, the interconnect layer provides an interface to the physical layer from the application by providing a variety of physical mechanisms and switched topologies so that the application is abstracted from the physical interconnect. In one embodiment, the system allows processing components to communicate over one or more FPGAs without specific knowledge of the interconnect structure and without components having specific knowledge of the particular topology, particular cards or anything else. This is because the application is abstracted by the interconnect layer which actually handles setting up the particular routing required, essentially at instantiation time. In short, the system decouples the application components from needing to know anything about the particular fabric, meaning that the subject system provides a very rich interconnect service.

Thus when a core or cores are loaded into an FPGA, the FPGA interconnect IP core is positioned between the application or applications instantiated in the FPGA and the physical layer supported by a given vendor. Note that the interconnect layers are that which are distributed amongst the FPGAs, with complementary parts of the interconnect layer being provided at the different FPGAs.

When an aviation suite is provided in such a manner, one can in one instance do spatial processing which requires a specific data flow to be supported. This would include the classic scatter gathering problem across a number of input sensors and destinations. For communication applications, one has some number of tuners and transmitters that are supporting different signal structures from different radios. Thus the subject fabric has to bridge data from one receiver to a transmitter and this may occur multiple times.

For instance, in order to do a mode change to support signal intelligence one abandons the communications support and may double the amount of frequency spectrum that one can cover by allocating all of the receive channels to support nothing but spatial processing and by implementing the scatter gathering problem across all of the tasked nodes. It will be appreciated that in so doing no new wiring of any kind is required in subject fabric. Additionally, the subject fabric is able to support the low and deterministic latency required.

If for instance one wants to go from communications to signal intelligence one may need to allocate all of the resources to this problem and to do so without rewiring or writing different software.

The utilization of the applications unaltered by the interconnect also and importantly eliminates the problem of providing a large amount of non-recurring engineering.

With the above reconfiguration management, all of the equipment is reusable providing increased utilization and efficiency. One obviously first writes something that is generic and reprogrammable from an interface point of view and provides one wrapper that helps plug in the standard interconnect logic that never has to be changed. One can change topologies, functions, and change mixes of functions, and do so only by throwing the switches in the subject interconnect layer provided between the application and the physical layer. Thus, even if one has ten different topologies or configurations, one does not have to redo the interconnect layer of the FPGAs ten times. As a result what is accomplished is efficient mode change both from the point of view of design and from the point of view of implantation.

As will be appreciated, the subject fabric combines the ability to support deterministic, low latency interconnects versus simple packet switching which generally does not have deterministic latency. As will be appreciated latency does not always end up being as short as one would like it to be. With the subject fabric one can accommodate packet switched topologies or circuit switched topologies and quite often applications that require both. One can have messaging to get from one node to another which is not necessarily time critical; but there are applications where accompanying strobes are absolutely critical.

In summary, a reconfigurable compute engine interconnect fabric includes a reconfigurable interconnect layer within each reconfigurable compute engine between the application loaded into the engine and the physical layer used for inputs to and outputs from the engine. The reconfigurable interconnect layer identifies the input and output pins for the engine and their functions. Thus, a system made up of reconfigurable compute engines can be changed by loading appropriate applications into respective engines and connecting complementary engines by defining the pins and specifying their functions using the reconfigurable interconnect layer such that no physical connecting structure need be changed to effectuate a mode change. The fabric supports strobes, clocks and various forms of data transfer including circuit switched, packet switched and discrete signal modes. Moreover, the fabric is flexible enough to support deterministic low latency interconnects or simple packet switching which does not have deterministic latency, node to node messaging and both packet switched and circuit switched topologies. In one embodiment, the reconfigurable compute engines include FPGAs.

BRIEF DESCRIPTION OF THE DRAWINGS

These and other features of the subject invention will be better understood in connection with the Detailed Description in conjunction with the Drawings, of which.

DETAILED DESCRIPTION

Figure 1:
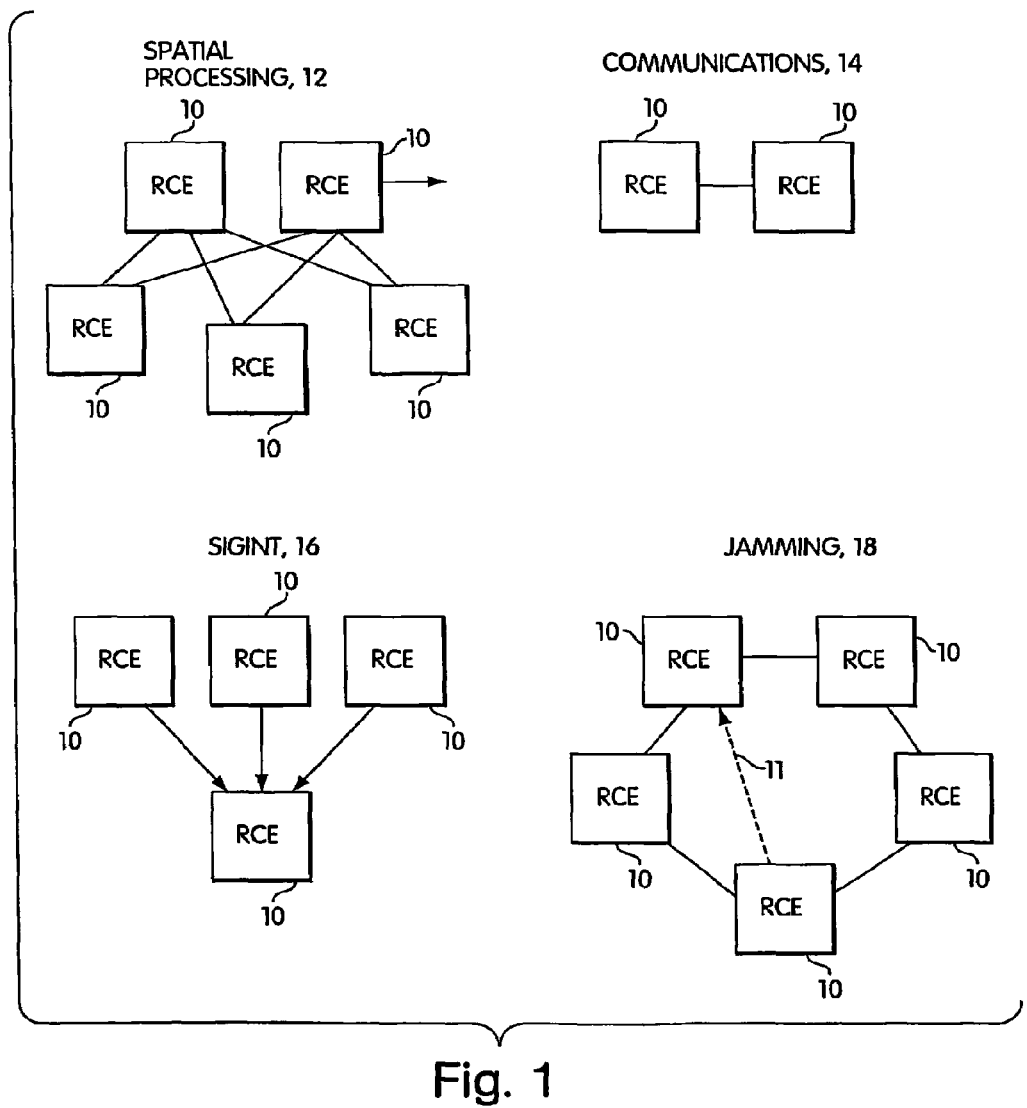
FIG. 1 is a diagrammatic representation of the utilization of reconfigurable compute engines interconnected variously to provide spatial processing, communications, signal intelligence and jamming in which different ones of the reconfigurable compute engines are connected together through the subject interconnect structure or fabric.

Referring now to FIG. 1, in an avionics suite a number of reconfigurable compute engines 10 may be interconnected so as to perform a number of functions. One of the functions may be a spatial processing function illustrated at 12 in which various of the physical layers of the reconfigurable compute engines are interconnected to provide a spatial processing function. Assuming a communications function 14 is desired, then selected reconfigurable compute engines are connected together for the communications function. Likewise for a signal intelligence function 16, various of the reconfigurable compute engines are interconnected as illustrated, whereas for a jamming function 18 the reconfigurable compute engines may be arranged, for instance, in a ring topography and connected by the subject fabric. As illustrated by dotted line 11, in the ring topography scheme direct connection of RCEs is possible.

Figure 2:
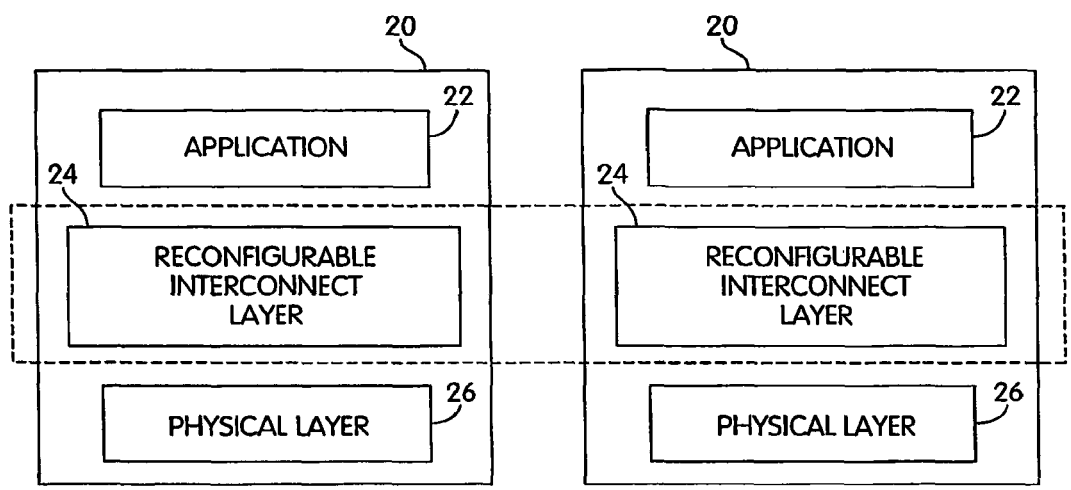
FIG. 2 is a diagrammatic representation of the utilization of an interconnect layer between an application layer and a physical layer in complementary FPGAs.

In order to provide for the reconfigurable interconnect structure shown in FIG. 1, each of the reconfigurable compute engines as illustrated in FIG. 2 may include an FPGA 20 with each of the FPGAs having an applications layer 22 an interconnect layer 24 and a physical layer 26 that interconnects the two FPGAs.

It is the purpose of this invention to be able to interconnect complementary FPGAs through the use of an invariant physical layer in which the interconnect layer defines the input and output for each of the FPGAs both as to the type of pin that they represent and also which pins are connected to what pins between the FPGAs.

With this arrangement, the applications loaded into the FPGAs may be made to change depending on the mode of operation for the entire system, with the physical layer being a fabric which connects the pins of complementary FPGAs together under the control of the interconnect mechanism which resides in the FPGA interconnect layer.

Figure 3:
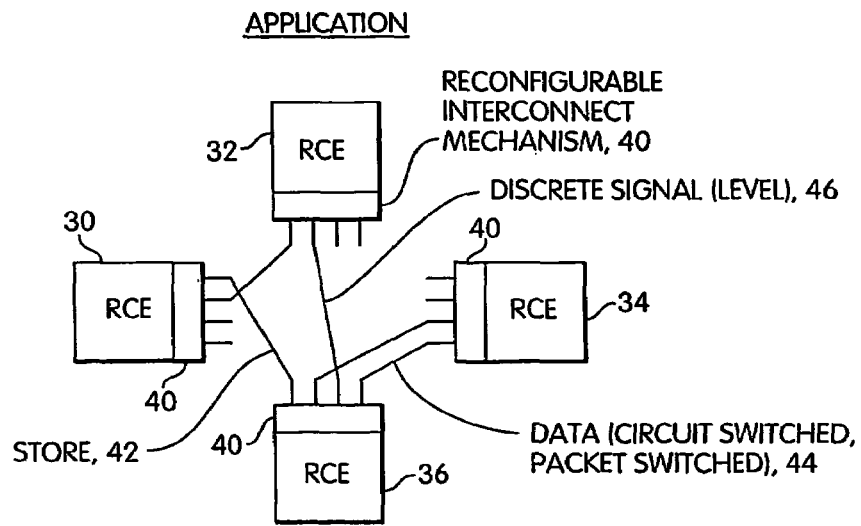
FIG. 3 is a diagrammatic representation of the utilization of a number of different reconfigurable compute engines coupled together by their physical layers so as to support strobing, the data flow, discrete signaling through the utilization of a reconfigurable interconnect mechanism, the mechanism being the reconfigurable layer of FIG. 2.

Referring to FIG. 3, each of the RCEs 30, 32, 34 and 36 has a physical layer 40 which constitutes a reconfigurable interconnect mechanism under the control of the interconnect layer within the RCE. As can be seen, one interconnect between RCE 30 and RCE 36 supports a strobe 42, whereas for instance, the interconnect 44 between RCE 34 and 36 supports data flow between these two RCEs, with the data flow, for instance, being either circuit switched or packet switched. Other types of data can be transmitted between, for instance, RCE 36 and RCE 32 over an interconnection 46 which supports, for instance, discrete signaling in terms of the level of a signal transmitted.

The subject system is different from the bus structure shown at 50 in which a number of general purpose processors 52 are interconnected by a bus 54 to which are applied time sequenced or multiplex signals such that the interconnection between the general purpose processors is not done in parallel but rather is done serially.

Figure 5:
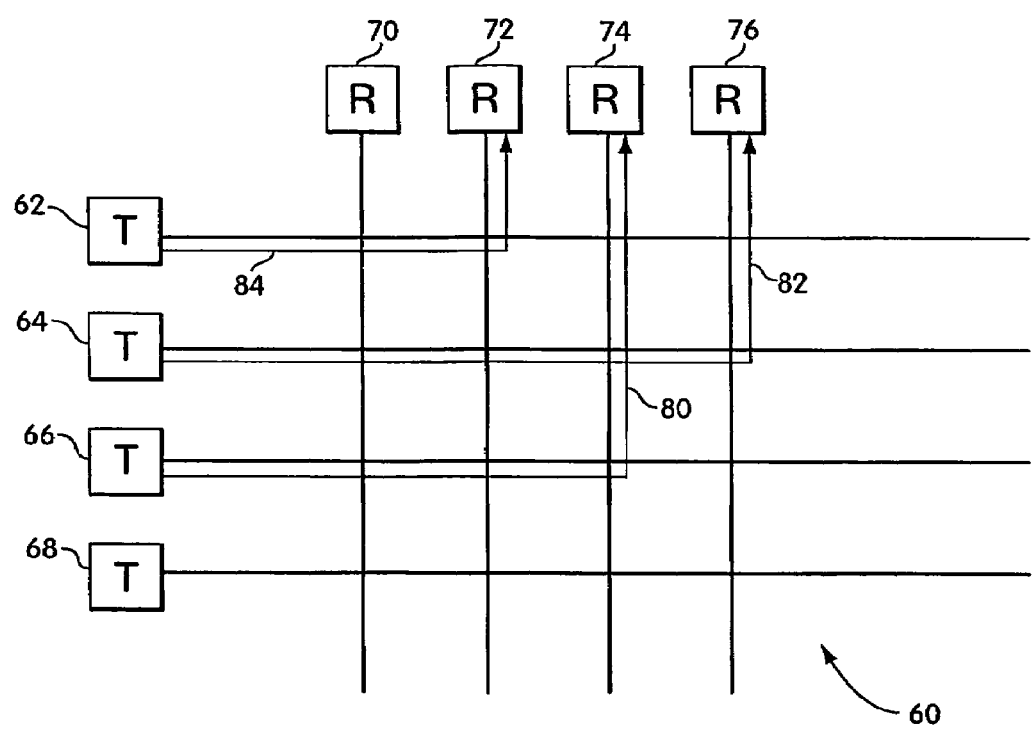
FIG. 5 is a diagrammatic illustration of a cross point structure which would, for instance, connect transmit nodes of various RCEs to receive nodes utilizing the subject interconnect fabric.

Referring to FIG. 5, what is shown in general is a cross point connection matrix 60 diagrammatically illustrating how complementary FPGAs can be connected by virtue of a fabric. Here a number of transmitter pins 62, 64, 66 and 68 are selectively connected to complementary receiver pins 70, 72, 74 and 76, with the cross point fabric providing the connection of transmitter pin 66 to receiver pin 74 overlying 80 whereas transmitter pin 64 is connected to receiver pin 76 over line 82, with transmitter pin 62 connected to receiver pin 72 over line 84. What will be appreciated is that the connections provide a parallel connection as opposed to the serial connection associated with any type of bus structure.

Figure 6:
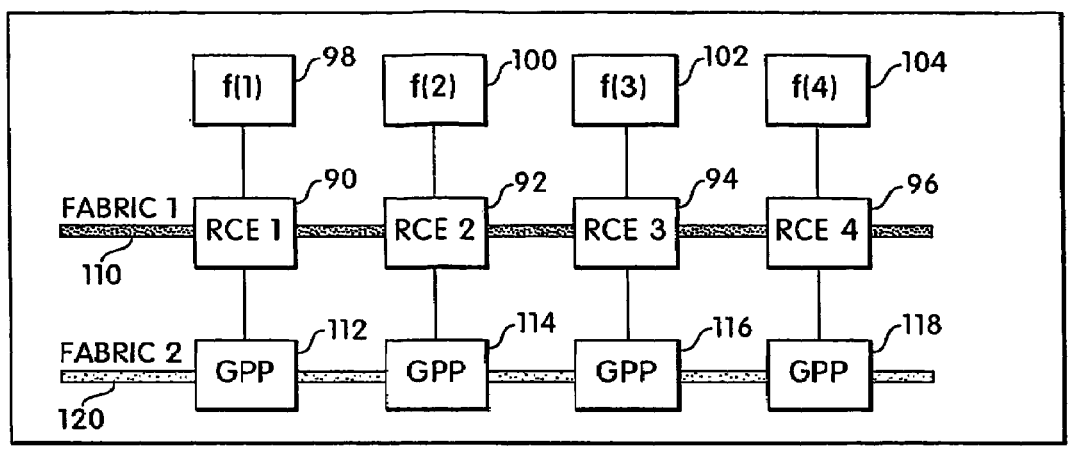
FIG. 6 is a block diagram of the interconnection of a number of reconfigurable compute engines, each with a different function, interconnected with the subject fabric, with general purpose processors connected together with their own fabric, and with the reconfigurable compute engines coupled to respective general purpose processors; and, FIG. 7 is a block diagram illustrating the utilization of an interconnect fabric for the interconnection of several reconfigurable compute engines, with the first RCE having pins defining data transmitters, an unused pin and a defining a strobe receiver, and with a complementary reconfigurable compute engine having corresponding data receivers, an unused pin and a strobe transmitter, with the data transmitter/receiver connection representing a connection oriented circuit switched data path, with the unused connection representing an unused physical path, and with the strobe transmitter/receiver connection representing a connection oriented circuit switched event strobe path.

As can be seen from FIG. 6, a number of RCEs 90, 92, 94 and 96 are provided respectively with various functions 98, 100, 102 and 104. These are the functions that are required to be performed by of the RCEs to effectuate a given mode of operation. The subject fabric 110 is utilized to interconnect all of the RCEs.

As can be seen, each of the RCEs is connected to its associated general purpose processor, here respectively illustrated at 112, 114, 116 and 118 interconnected with a second fabric 120 of a conventional Ethernet or other variety.

The entire system illustrated in FIG. 6 can made to execute a number of functions depending on the functions f1-f4 loaded into the respective RCEs. Fabric 110 interconnects the RCEs in such a manner as to effectuate the particular mode.

Figure 7:
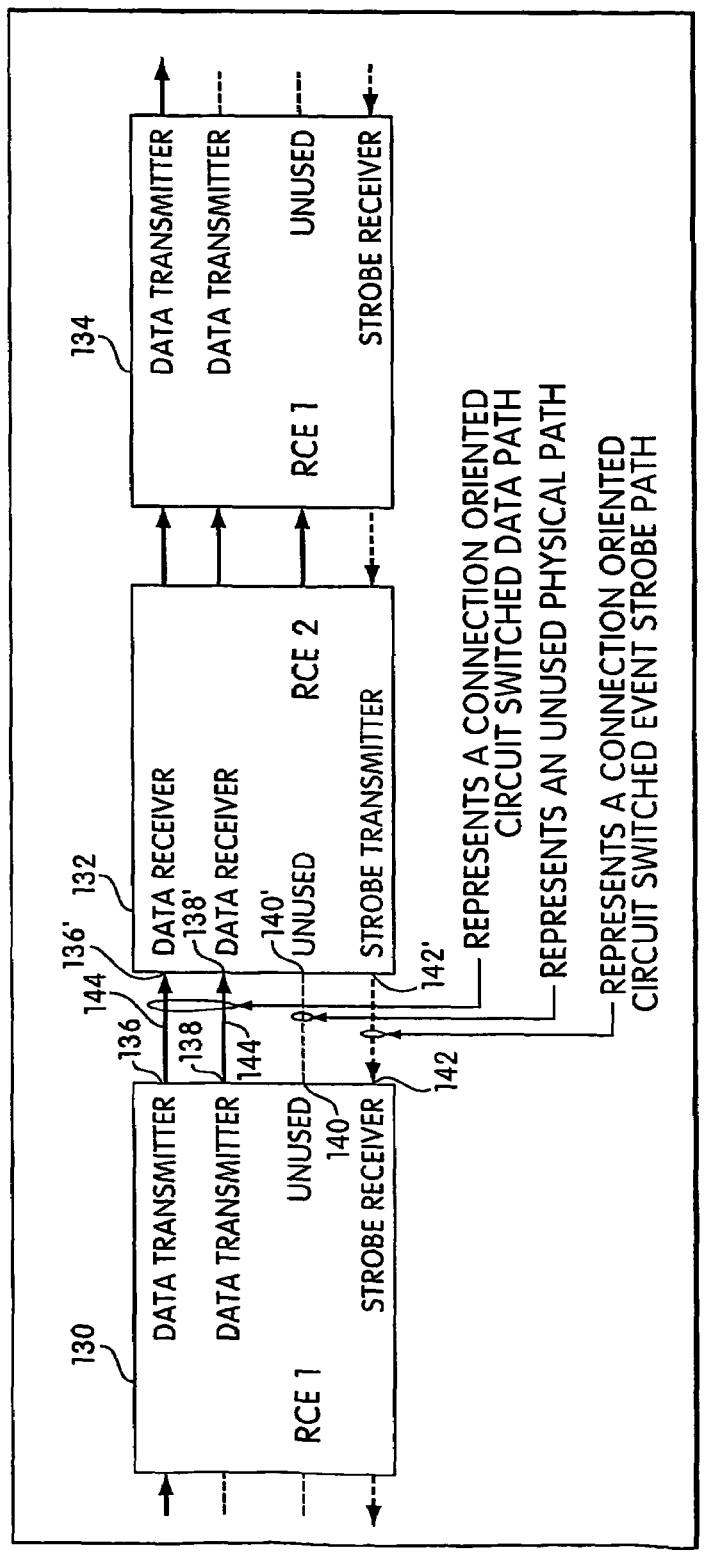

Referring to FIG. 7, in one example, a number of RCEs 130, 132 and 134 are interconnected by connecting various pins 136, 138, 140 and 142 on RCE 130 to complementary pins 136', 138', 140' and 142'.

Thus for instance, data transmitter pins 136 and 138 on RCE 130 are connected to complementary pins 136' and 138' respectively for RCE 132, which pins correspond to data receiver pins. The connections designated by arrows 144 correspond to a connection oriented switched circuit data path between RCE 130 and RCE 132.

Likewise a path 146 between strobe transmitter pin 142' at RCE 132 is established by connection to a strobe receiver pin 142 on RCE 130. Note that path 146 represents a connection oriented circuit event strobe path in this case.

What will be appreciated is that the interconnect layer for each of the RCEs defines the pin and what the function of the pins is so that the physical layer remains invariable, with the pins and their functions being determined by the interconnect layer. Thus the physical layer remains unchanged, whereas the interconnect functions are programmable through the programming of the interconnect layer. Note that the programming of the interconnect layer does not affect either the application or the physical layers so that mode changes can be rapidly effectuated utilizing the same or lesser numbers of available RCEs.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. An apparatus comprising:
a reconfigurable compute engine comprising an application layer and a physical layer; and
an interconnect fabric in communication with the application layer and the physical layer;
wherein the interconnect fabric is configured to redefine interconnects with a second reconfigurable compute engine wherein a redefined interconnect comprises a new function of the reconfigurable compute engine without modification of the physical layer and the application layer; and
wherein the interconnect fabric is configured to dynamically activate and deactivate one or more pins on the reconfigurable compute engine, which is communicatively coupled by the interconnect fabric, based on an instruction from the reconfigurable compute engine.

2. The apparatus of claim 1, wherein the one or more pins are configured to transmit timing signals.

3. The apparatus of claim 2, wherein the timing signals include a strobe.

4. The apparatus of claim 1, wherein the one or more pins are configured to transmit packet switched signals.

5. The apparatus of claim 1, wherein the one or more pins are configured to transmit circuit switched signals.

6. The apparatus of claim 1, wherein the one or more pins are configured to transmit discrete signal level transmissions.

7. The apparatus of claim 1, wherein the reconfigurable compute engine further comprises a field programmable gate array.

8. A system comprising:
a first reconfigurable compute engine (RCE);
a second RCE;
an interconnect fabric configured to dynamically activate and de-activate one or more pins on at least one of the first RCE and the second RCE, which are communicatively coupled by the interconnect, based on an instruction from at least one of the first RCE and the second RCE; and
an interconnection of the first RCE and the second RCE through the interconnect fabric;
wherein the interconnect fabric is configured to be reprogrammable to redefine the interconnection wherein a redefined interconnect defines a new function of the first and second RCE without modification of corresponding physical layers and application layers of the first RCE and the second RCE.

9. The system of claim 8, wherein the one or more pins on the at least one of the first RCE and the second RCE are complementary.

10. The system of claim 9, wherein the complementary one or more pins comprise transmitting and receiving functions respectively.

11. A method comprising:
receiving an instruction by an interconnect layer from at least one of a first reconfigurable compute engine (RCE) and a second RCE, wherein the first RCE and the second RCE are communicatively coupled by the interconnect layer;
dynamically activating and de-activating, by the interconnect layer, one or more pins on the at least one of the first RCE and the second RCE in response to the instruction;
interconnecting inputs and outputs of the interconnect layer to accommodate a new application loaded on at least one of the first and second RCE; and
performing the new application without reconfiguring a physical layer and without modification of an application layer of the first and second RCE.

12. The method of claim 11, wherein the dynamically activating and de-activating the one or more pins is selected by the interconnect layer.

13. The method of claim 11, wherein the one or more pins on the at least one of the first RCE and the second RCE have complementary pins.

14. The method of claim 11, wherein functions of the one or more pins on the at least one of the first RCE and the second RCE include at least one of a packet switched data transfer function, a circuit switched data transfer function, or a discrete signal level transfer function.

* * * * *

UNITED STATES PATENT AND TRADEMARK OFFICE
CERTIFICATE OF CORRECTION

PATENT NO. : 8,411,676 B2
APPLICATION NO. : 12/546657
DATED : April 2, 2013
INVENTOR(S) : Thiele et al.

Page 1 of 1

It is certified that error appears in the above-identified patent and that said Letters Patent is hereby corrected as shown below:

In the Drawings:

In Fig. 3, Sheet 3 of 6, delete "STORE, 42" and insert -- STROBE, 42 --, therefor.

Figure 4:
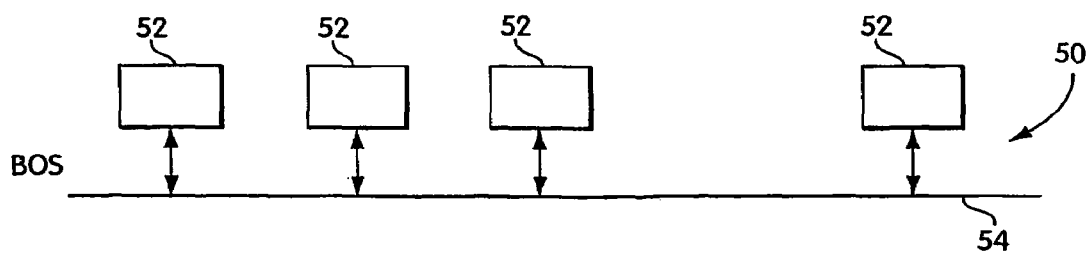
FIG. 4 is diagrammatic illustration of the utilization of a bus structure to interconnect general purpose computers, illustrating the sequential nature of the bus.

In Fig. 4, Sheet 3 of 6, delete "BOS" and insert -- BUS --, therefor.

In the Specifications:

In Column 2, line 12, delete "RCE," and insert -- RCEs, --, therefor.

In Column 2, Line 16, delete "Myrinnet," and insert -- Myrinet, --, therefor.

In Column 6, Line 16, delete "is diagrammatic" and insert -- is a diagrammatic --, therefor.

Signed and Sealed this
Ninth Day of July, 2013

Teresa Stanek Rea
*Acting Director of the United States Patent and Trademark Office*